United States Patent [19]

Akutsu et al.

[11] 4,047,069
[45] Sept. 6, 1977

[54] HIGH-PRESSURE MERCURY-VAPOR LAMP HAVING A PLURAL PHOSPHOR COATING

[75] Inventors: Hidezo Akutsu, Hyogo; Katsuaki Iwama, Osaka; Naoki Saito, Osaka; Masanori Takagawa, Osaka; Yoshichika Kobayashi, Osaka; Tamisuke Atsumi, Kobe, all of Japan

[73] Assignee: Matsushita Electronics Corporation, Osaka, Japan

[21] Appl. No.: 588,951

[22] Filed: June 20, 1975

[30] Foreign Application Priority Data

| June 21, 1974 | Japan | 49-71542 |
| June 21, 1974 | Japan | 49-71543 |
| June 21, 1974 | Japan | 49-71544 |
| June 21, 1974 | Japan | 49-71546 |

[51] Int. Cl.$^2$ ............................................. H01J 1/62
[52] U.S. Cl. .................................. 313/487; 313/110; 313/486
[58] Field of Search ...................... 313/485, 486, 487

[56] References Cited

U.S. PATENT DOCUMENTS

| 3,748,517 | 7/1973 | Haft | 313/487 |
| 3,875,453 | 4/1975 | Thurnton, Jr. | 313/487 |

Primary Examiner—Rudolph V. Rolinec
Assistant Examiner—Lawrence J. Dahl
Attorney, Agent, or Firm—Wenderoth, Lind & Ponack

[57] ABSTRACT

A high pressure mercury vapor lamp having an outer bulb with a plural-phosphor coating on the inside surface thereof. A first phosphor provides for emission peaks within the range of wavelengths between 440 and 540 nm and contains strontium chloroapatite, barium magnesium aluminate, strontium chlorosilicate, barium magnesium aluminate, or barium strontium silicate, each activated with di-valent europium. A second phosphor includes yttruim vanaphosphate activated with tri-valent europium which has emission peaks between 600 and 720 nm.

2 Claims, 10 Drawing Figures

Note: The subjects stayed for about 30 minutes before making the observations in a room illuminated with an incandescent fluorescent lamp. Thereafter, they entered each room (3m x 4m) where each lamp to be observed was lit, to make the observation of the lamp.

Note: The value of the output ratio of $P_{440\sim540}/P_{577\sim9}$ was found to be about 0.8 for 90% phorphors (C:D:F=3.0 : 1.0: 6.0) and about 1.0 for 80%, and about 0.40 for 90% phorphors (C:D:F = 1.2: 0.4: 8.4) and about 0.60 for 80%.

The subjects were treated in the same was as shown in Figure 5.

Note: The output ratio of $P_{440\sim540}/P_{600\sim720}$ showed a value about 1.1∼1.3 times as high as the ratio of $(C+D)/F$ by weight.

Note: The subjects were treated in the same way as in the case of Figure 5.

Note: The subjects were treated in the same way as in Figure 5.

HIGH-PRESSURE MERCURY-VAPOR LAMP HAVING A PLURAL PHOSPHOR COATING

BACKGROUND OF THE INVENTION

This invention relates to a high-pressure mercury-vapor lamp with a phosphor coating.

High-pressure mercury-vapor lamps are most popular as the lamps for outdoor illumination, and are expected to be widely used in the future because of their stable lamp characteristics and excellent economic advantages. These lamps may be roughly divided into the transparent type and the diffusion type. In the former, only the visible line spectrum of mercury generated from the arc discharge is utilized for illumination and accordingly, its color rendition index $Ra$ runs as low as about 25; whereas in the latter, the ultraviolet radiations of mercury are utilized to stimulate the phosphors to cause them to emit visible rays by coating the inside surface of the outer bulb with a phosphor layer, to substantially improve its color rendering property. For example, these color corrected high pressure mercury vapor lamps in which such red light emitting phosphors as yttrium vanaphosphate or yttrium vanadate activated with trivalent europium are used, may provide a general color rendering index of about 42–45. Even these color corrected high pressure mercury vapor lamps having improved color rendition are still unsatisfactory for lamps for general indoor illuminations.

Lamps of high brightness for indoor illumination of offices and lobbies have recently come into great demand. High-pressure mercury-vapor lamps available on the market have failed to meet this demand, because of their inferior color rendering property.

SUMMARY OF THE INVENTION

The object of this invention is to provide high-pressure mercury-vapor lamps having greatly improved color rendition so that they are useful for general indoor illumination.

The present inventors conducted comprehensive and detailed studies including all kinds of lamps for the purpose of achieving this objective.

In the first place, they attempted to improve the color rendition of diffusion type lamps manufactured according to the same specification as those of mercury lamps available on the market, by coating the inside surface of the outer bulb with blue-green light emitting phosphors in addition to the red light emitting phosphor. As the blue-green phosphors, several types which had emission peaks at wavelengths of 440–540 nm were prepared. The lamps were manufactured, with these phosphorus mixed with red light emitting phosphor in various mixing ratios, and their color rendition properties were measured. The lamps thus obtained had a general color rendering index of about 65, a value comparable to that of white light fluorescent lamps used for general indoor illumination purposes. Among these lamps having such high $Ra$ values, however, some lamps were found objectionable from the standpoint of the visual sense, because human skin looks too yellowish when illuminated by them. In connection with this phenomenon, the large outputs of the mercury line spectrum at wavelengths 577–579 nm in the discharge tubes turned out to be relevant. The present inventors as a result of detailed studies, have discovered how to make high-pressure mercury-vapor lamps capable of good color rendition and that give favorable color rendition of human skin, by matching the energy output of phosphors with the output of the mercury line spectrum of the discharge tube in special relationships. The inventors examined the lamps, in regard to their color rendition in which the output from phosphors having emission peaks at wavelengths in the ranges of 400–540 nm and 600–720 nm, and the output of the mercury spectrum a wavelength of 546 nm and wavelengths of 577–579 nm were widely varied. As a result, they found that high-pressure mercury-vapor lamps not only provide general color rendition indicies higher than about 60, but also give a favorable color rendition human skin, provided the following three relationships are satisfied simultaneously.

$$0.50 \leq P_{577-579} / P_{546} \leq 1.0 \tag{1}$$

$$0.3 \leq P_{440-540} / P_{577-579} \leq 1.2 \tag{2}$$

$$0.1 \leq P_{440-540} / P_{660-720} \leq 1.0 \tag{3}$$

where $P_{577-579}$: Mercury line spectrum outputs at wavelengths of 577–579 nm.

$P_{546}$: Mercury line spectrum outputs at 546 nm.

$P_{440-540}$: Total emission output in the range of wavelengths of 440–540 nm $P_{600-720}$: Total emission output in the range of wavelengths of 600–720 nm (Note: The units used all through this specification are relative values.)

(Provided that $P_{440-540}$ and $P_{600-720}$ all do not include the output of the mercury line spectrum.)

The inventors also found that the same results can be obtained if, instead of the above formula (1), the following formula (1') can be satisfied on the mean electric potential gradient $Ed$(V/cm) of the arc in the discharge tube ($Ed$ = (lamp voltage)/(distance between the electrodes)).

$$21 \leq Ed \leq 52 \tag{1'}$$

EMBODIMENT OF THE INVENTION

Figure 1:
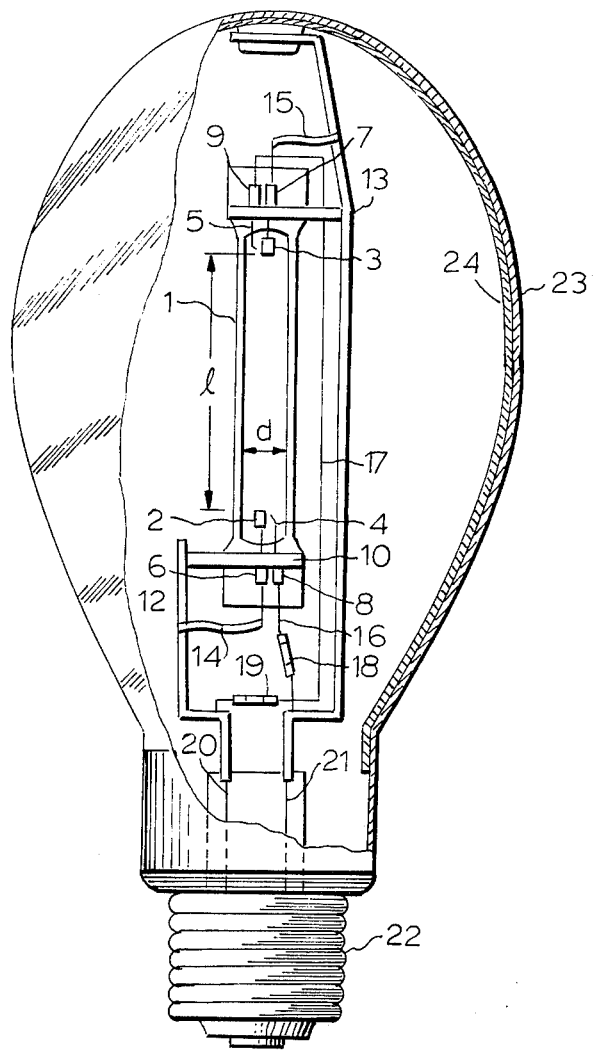
FIG. 1 is a partially broken away sectional view showing a high-pressure mercury-vapor lamp embodying this invention.

Referring to FIG. 1, numeral 1 represents a discharge tube made of a transparent material, for example quartz, to both ends of which electrodes 2 and 3 made of tungsten, and auxiliary electrodes 4 and 5 are sealed respectively with intermediate molybdenum foils 6, 7, 8 and 9 for the respective electrodes. Inside the discharge tube, an appropriate amount of mercury (which will be described later), and 30 Torr of argon for starting-up are sealed in. The discharge tube is supported by supporting plates 10 and 11 on stem wires 12 and 13, the conductors 14 and 15 coming from the electrodes 2 and 3 respectively being electrically connected to the stem wires 12 and 13, and the conductors 16 and 17 from the auxiliary electrodes 4 and 5 respectively being electrically connected to the stem wires 13 and 12 respectively through the starting resistances 18 and 19. The stem wires 12 and 13 are associated with the base 22 through the lead wires 20 and 21. The discharge tube is further incorporated within and is supported by the outer bulb 23 made of hard glass, in which an inert such as nitrogen is sealed. On the inside surface of the outer bulb 23, a phosphor layer 24 is applied.

The various phosphors used have emission peaks at wavelengths 450 nm, 490 nm, 505 nm, 518 nm or 617 nm respectively, as shown in Table 1. Such phosphors were applied on the inside surface of the outer bulb either singly or in combination of more than two.

Table 1

| Codes | Designations | Wave length of emission peaks in nm | Half-value width in nm |
|-------|--------------|-------------------------------------|------------------------|
| A | Strontium chloroapatite activated with di-valent europium | 450 | 60 |
| B | Barium magnesium aluminate activated with di-valent europium | 452 | 51 |
| C | Strontium chlorosilicate activated with di-valent europium | 490* | 74 |
| D | Barium magnesium aluminate activated with di-valent europium | 518 | 30 |
| E | Barium strontium silicate activated with di-valent europium | 505 | 107 |
| F | Yttrium vanaphosphate activated with tri-valent europium | 617 | — |

*The peak value is shifted to about 480 nm due to the temperature rise when the lamp is lit.

Figure 2:
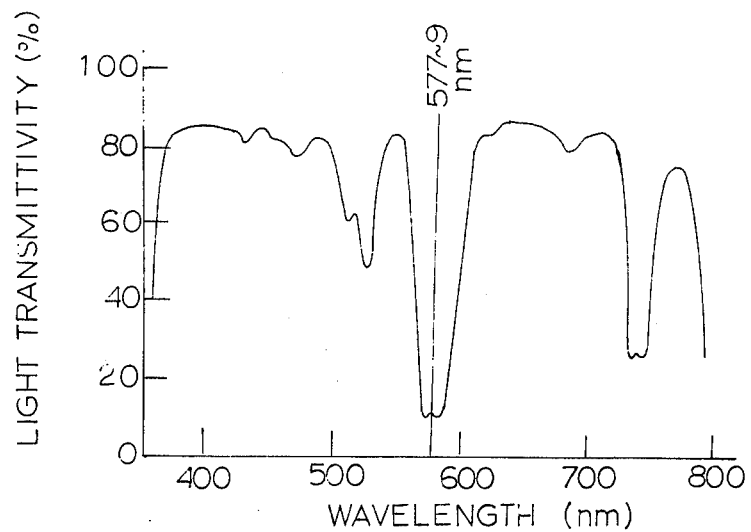
FIG. 2 is a graph of light transmissivity of a neodynium glass as a function of wave length.
Figure 3:
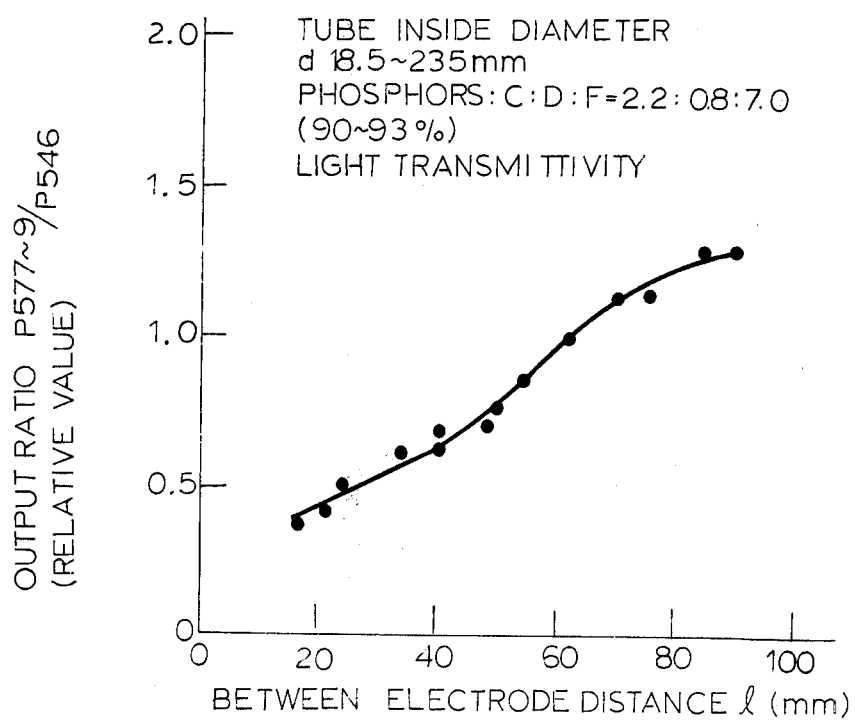
FIG. 3 is a graph showing the $P_{577-579} / P_{546}$ ratio as a function of between electrode distance.
Figure 4:
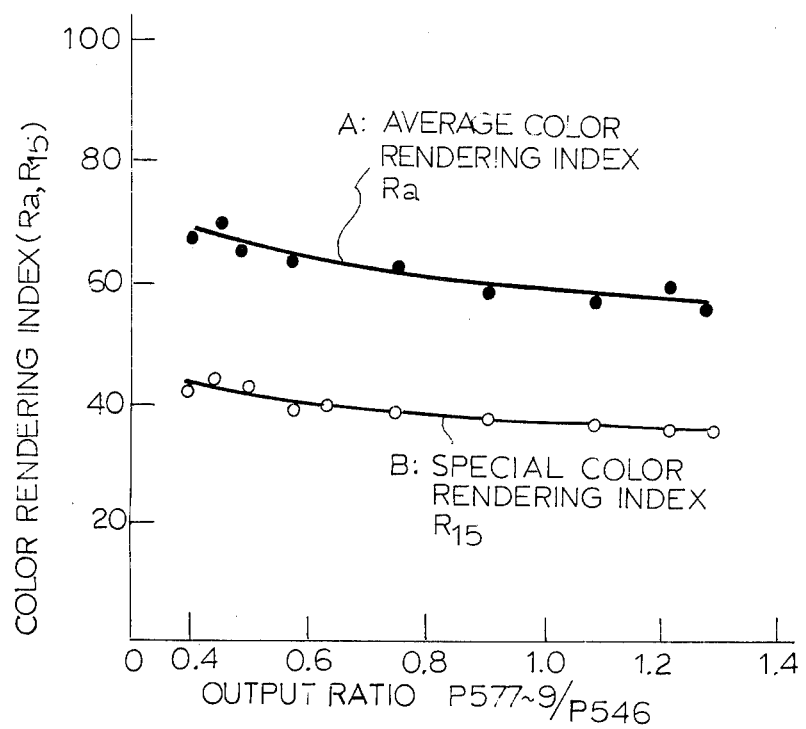
FIG. 4 is a graph of the color rendition index as a function of $P_{577-579} / P_{546}$ ratio.

To begin with, lamps with various $P_{577-579} / P_{546}$ ratios were prepared and their color rendition was examined. The ratio $P_{577-579} / P_{546}$ can be varied, by using an outer bulb containing neodymium, by coating the outer bulb with neodymium oxide mixed with phosphor powder (FIG. 2), or by varying the distance between the electrodes (FIG. 3). The outer bulb was coated with phosphor material which has a mixture of phosphors C, D and F of Table 1, in a weight ratio of C : D : F = 2.2 : 0.8 : 0.8. Lamps thus prepared were lit with wall load of 7-18 W/cm², and the color rendering property was examined, and the following conclusions were reached;

1. The general color rendition index Ra and the special color rendition index $R_{15}$ increase as the ratio $P_{577-579} / P_{546}$ decreases, as shown by FIG. 4.

Figure 5:
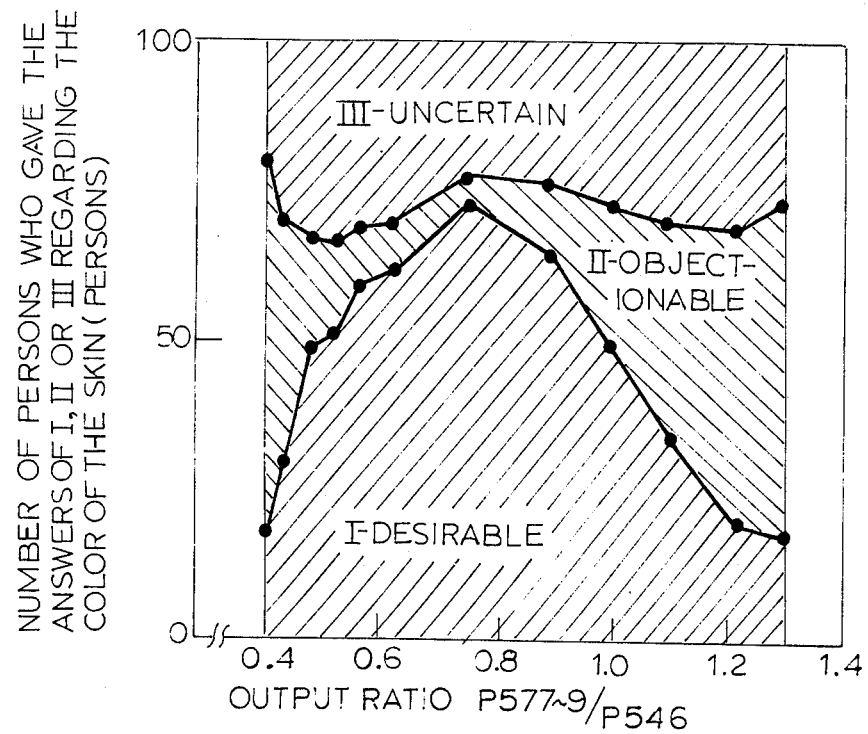
FIG. 5 is a graph showing the ratio of various response of persons to color rendition of their skin as a function of the $P_{577-579} / P_{546}$ ratio.

2. Color rendition of human skin is greatly improved, provided the ratio $P_{577-579} / P_{546}$ is in the range 0.50-1.0, especially from 0.60-0.90, whereas lamps with a $P_{577-579} / P_{546}$ ratio larger than 1.0 give a light which is too greenish, and lamps with a $P_{577-579} / P_{546}$ ratio less than 0.5 give a rendition which is too greenish as shown in FIG. 5.

Lamps with the $P_{577-579} / P_{546}$ ratio in the favorable range of 0.50 to 1.0 can be obtained by making the potential gradient of the mercury arc E$d$ between 21 V/cm and 52 V/cm.

In the case of 200W, 300W and 400W lamps, the lamp voltage of which must be 120 to 140V, an arc length of 2.5 cm to 6.2 cm is preferred.

Next, favourable spectral distribution was sought for by various combinations of the $P_{577-579} / P_{546}$ ratio and phosphor materials with various emission spectral bands and the following conclusions were reached;

1. As long as the ratio $P_{577-579} / P_{546}$ is in the range 0.50-1.0, irrespective of the phosphor material, lamps give a favourable color rendition of human skin.

Figure 6:
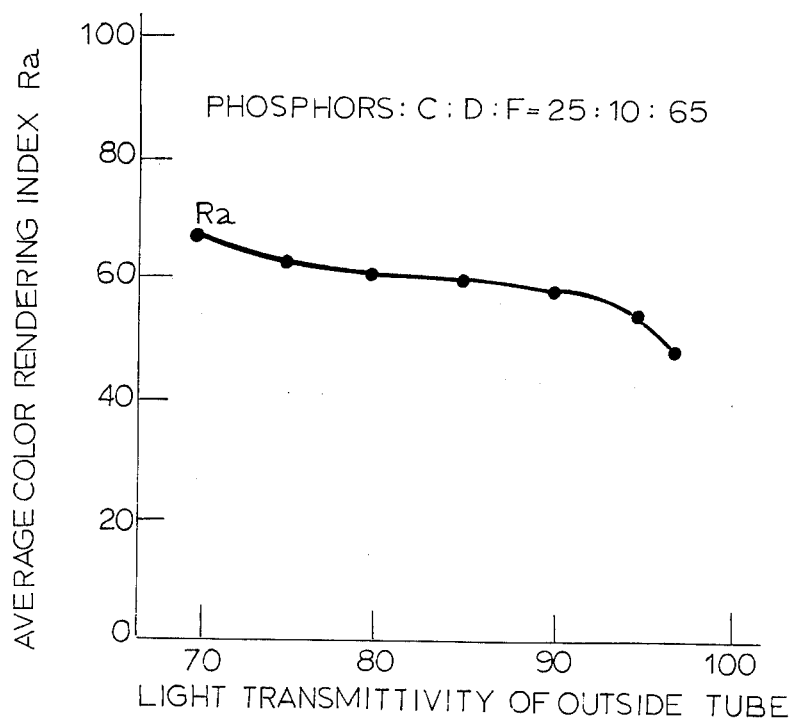
FIG. 6 is a graph of a general color rendition index as a function of light transmissivity of the outer bulb.

2. Generally, by reducing the output of the line spectrum by curtailing the transparency of the outer bulb, and by increasing the output of the band spectrum from the phosphor, both of which effects are achieved by the application of a thick layer of phosphors, the general color rendition index Ra increases as shown in FIG. 6. If the radiation between wavelengths of 440 and 540 nm is too strong, human skin is rendered displeasingly blueish or greenish, although the yellowish effect of wavelengths of 577-579 nm is supressed and the Ra value is rather high.

Figure 7:
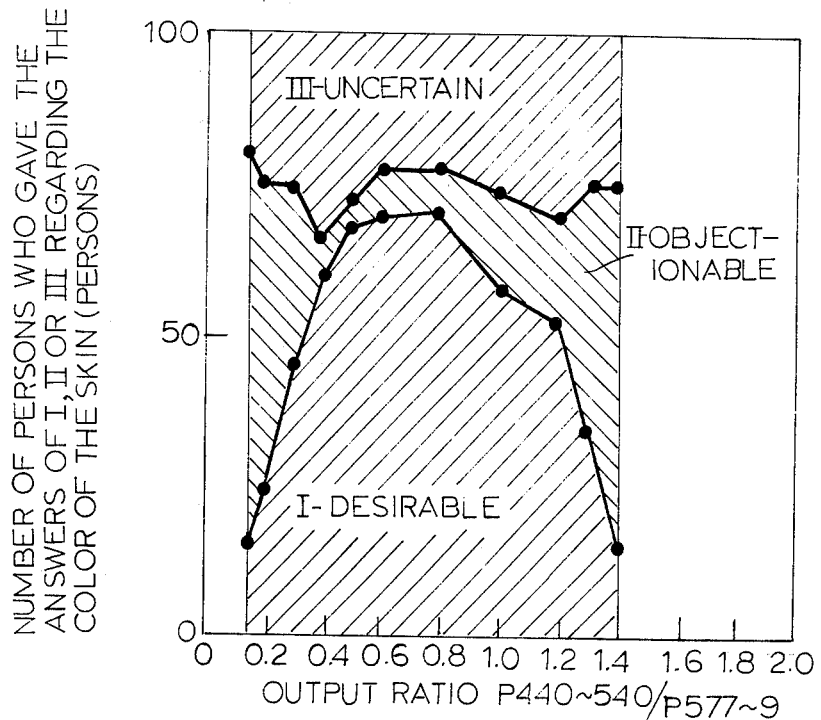
FIG. 7 is a graph showing the ratio of various responses of persons to color rendition of their skin as a function of the $P_{440-540} / P_{577-579}$ ratio.

This can be remedied by controlling the ratio $P_{440-540} / P_{577-579}$. From the color rendition study, the results of which are as shown in FIG. 7, the ratio $P_{440-540} / P_{577-579}$ is preferably in the following range, $$0.3 \leq P_{440-540} / P_{577-579} \leq 1.2 \qquad (2)$$

Specifically, it is preferred that the ratio be in the range of 0.4-0.9. If the ratio is less than 0.3, the rendition is too yellowish, and if the ratio is larger than 1.2, it is too blueish or greenish.

3. Radiation by phosphor materials was divided into two parts; radiation between wavelengths 440 and 540 nm, and radiation between wavelengths 600 and 720 nm, and the effect of the ratio $P_{440-540} / P_{600-720}$ upon color rendition was investigated.

Figure 8:
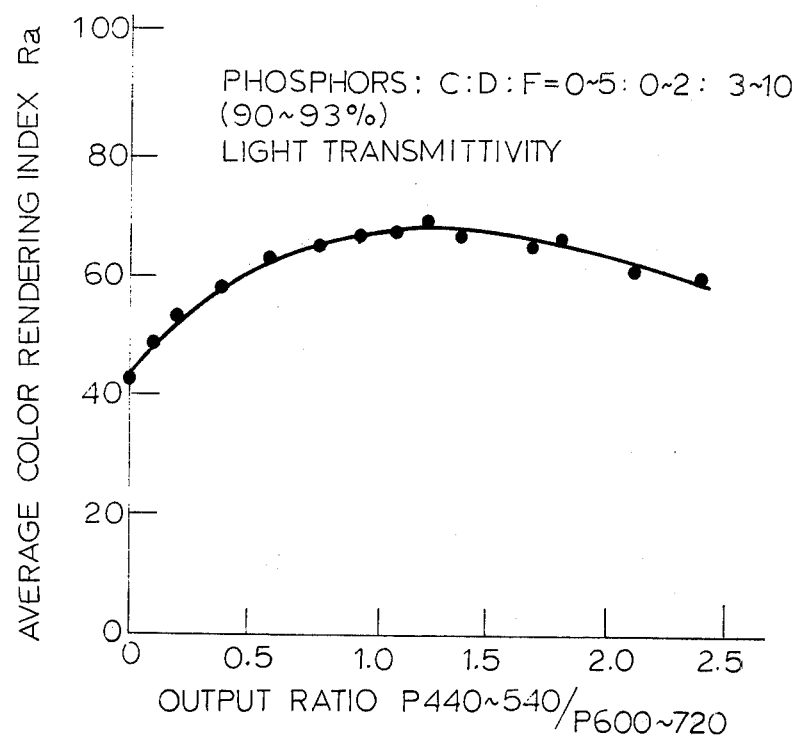
FIG. 8 is a graph of the general color rendition index $Ra$ as a function of the $P_{440-540} / P_{600-720}$ ratio.
Figure 9:
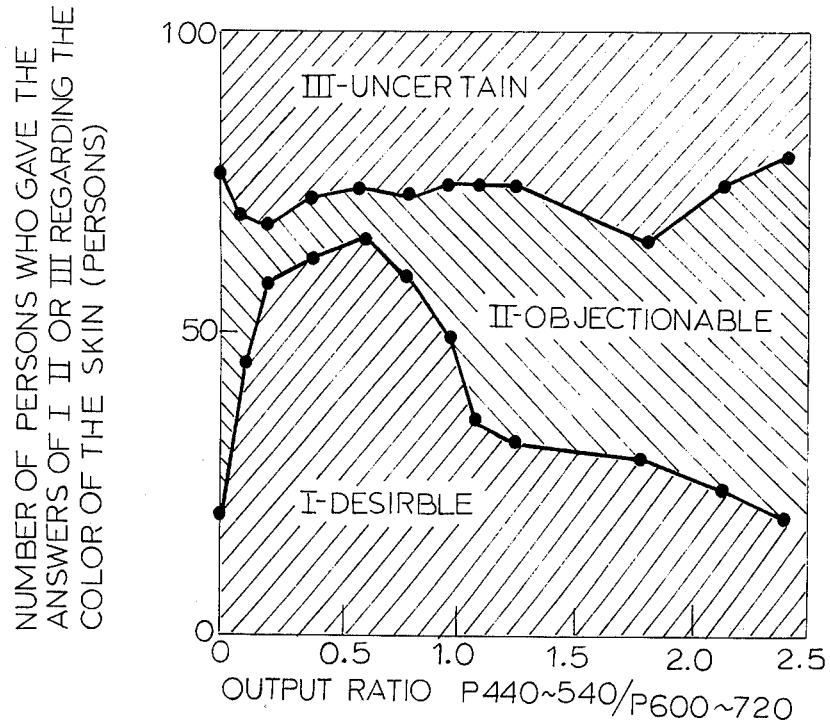
FIG. 9 is a graph showing the ratio of various responses of persons to color rendition of their skin as a function of the $P_{440-540} / P_{577-579}$ ratio.

As a result, Ra was found to be most favourable when this ratio is between 1.1 and 1.4, as shown in FIG. 8. The lamps with the highest value of Ra, however, gave unpleasant results to observers due to lack of a red component. In order to render the color of human skin well, the ratio $P_{440-540} / P_{600-720}$ is, irrespective of the Ra value, preferably in the range 0.1 to 1.0, especially 0.2 to 0.8, as shown in FIG. 9.

Figure 10:
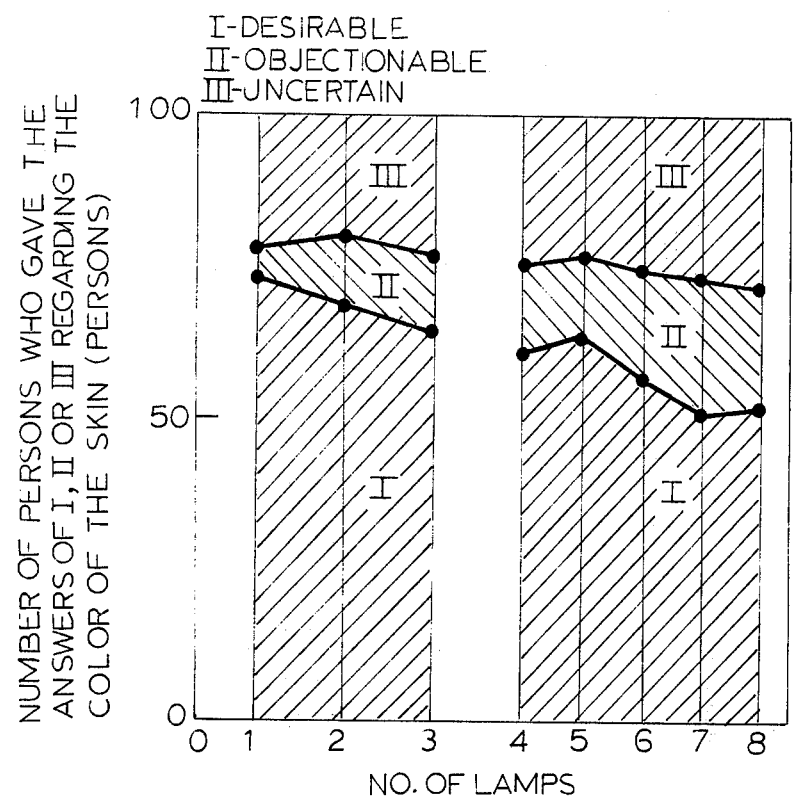
FIG. 10 is a graph showing the ratio of various responses of persons to color rendition of their skin for various lamps.

4. According to another opinion, it is a sine qua non for fluorescent light having a blue color output to have its peak at wavelengths of 440-470 nm to obtain a desirable color rendition of the skin. However, when the present inventors manufactured lamps with a mixture of phosphors having their peaks at wavelengths 450 nm, 490 nm, 506 nm or 515 nm, as shown in Table 2, and when the inventors made comparative observations of the color rendition effect of each of these lamps on the skin in color rendition tests, the test results as shown in FIG. 8 revealed no superiority of the phosphors having a peak at wavelength of 450 nm. The reason is because the lamps of this invention have discharge tubes of such a design that the adverse effect on the skin of the line spectra at wavelengths of 577-579 nm is already inhibited. The results of calculations made by the present inventors by way of simulation, by making use of an electronic computer showed that the highest value of the general color rendition index Ra was obtained by using phosphors having peaks at wavelengths of 470-530 nm. This contradiction may be partially recognized from the results of tests as shown in FIG. 10. Furthermore, it is desirable that phosphors having a 450 nm peak be employed in a mixture with those having peaks at a wavelength around 500 nm.

Table 2

| Lamp numbers | Mixing ratios of phosphors (in weights) | | |
|---|---|---|---|
| 1 | C : D : F | = | 2.2 : 0.8 : 7.0 |
| 2 | C : E : F | = | 2.5 : 0.5 : 7.0 |
| 3 | E : F | = | 3.0 : 7.0 |
| 4 | A : D : F | = | 2.0 : 1.0 : 7.0 |
| 5 | B : D : F | = | 2.0 : 1.0 : 7.0 |
| 6 | A : E : F | = | 2.0 : 1.0 : 7.0 |
| 7 | A : F | = | 3.0 : 7.0 |
| 8 | B : F | = | 3.0 : 7.0 |

Note: A, B, F designate the same phosphors as shown in Table 1.

What is claimed is:

1. A high-pressure mercury-vapor lamp comprising a discharge tube including electrodes sealed at both ends thereof, mercury and rare gas in said discharge tube, and an outer bulb around said discharge tube having a phosphor coating on the inside surface thereof, the phosphor coating being constituted by (a) a phosphor having emission peaks within the range of wavelengths between 440 and 540 nm and being at least one phosphor taken from the group consisting of strontium chloroapatite activated with di-valent europium, barium magnesium aluminate activated with di-valent europium strontium chlorosilicate activated with di-valent europium, barium magnesium aluminate activated with di-valent europium, and barium strontium silicate activated with di-valent europium, and (b) yttrium vanaphosphate activated with tri-valent europium and having emission peaks within the range of wavelengths between 600 and 720 nm, and the following conditions are satisfied:

$$0.50 \leq P_{577-579}/P_{546} \leq 1.0$$

$$0.3 \leq P_{440-540}/P_{577-579} \leq 1.2$$

$$0.1 \leq P_{440-540}/P_{600-720} \leq 1.0$$

where $P_{577-579}$ and $P_{546}$ are the relative energy outputs of the mercury spectrum at wavelengths of 577-579 nm and a wavelength of 546 nm, and $P_{440-540}$ and $P_{600-720}$ are the relative total energy outputs for other than the mercury line spectrum in the ranges of wavelengths of 440 to 540 nm and 600 to 720 nm produced by the stimulation of the phosphor coating by the ultraviolet radiations of the discharge tube.

2. A high-pressure mercury-vapor discharge lamp comprising a discharge tube including electrodes sealed at both ends thereof, mercury and rare gas in said discharge tube, and an outer bulb around said discharge tube having a phosphor coating on the inside surface thereof, the phosphor coating being constituted by (a) a phosphor having emission peaks within the range of wavelengths between 440 and 540 nm and being at least one phosphor taken from the group consisting of strontium chloropatite activated with di-valent europium, barium magnesium aluminate activated with di-valent europium, strontium chlorosilicate activated with di-valent europium, barium magnesium aluminate activated with di-valent europium, and barium strontium silicate activated with di-valent europium, and (b) yttrium vanaphosphate activated with tri-valent europium and having emission peaks within the range of wavelengths between 600 and 720 nm, and the following conditions are satisfied:

$$21 \leq Ed \leq 52$$

$$0.3 \leq P_{440-540}/P_{577-579} \leq 1.2$$

$$0.1 \leq P_{440-540}/P_{600-720} \leq 1.0$$

where $Ed$ is the electric potential gradient of the arc of said discharge tube (V/cm), and $P_{577-579}$ is the relative energy output of the mercury spectrum at wavelengths of 577-579 nm, and $P_{440-540}$ and $P_{600-720}$ are the relative total energy outputs for other than the mercury line spectrum in the ranges of wavelengths of 440 to 540 nm and 600 to 720 nm produced by the stimulation of the phosphor coating by the ultraviolet radiations of the discharge tube.

* * * * *